United States Patent
Yu

(10) Patent No.: US 12,543,253 B1
(45) Date of Patent: Feb. 3, 2026

(54) ENHANCED TOOLS AND TECHNIQUES FOR OPERATIONAL CONTROL AND CONFIGURATION OF LIGHTING SYSTEMS AND ASSEMBLIES

(71) Applicant: Chung Han Yu, City of Industry, CA (US)

(72) Inventor: Chung Han Yu, City of Industry, CA (US)

( * ) Notice: Subject to any disclaimer, the term of this patent is extended or adjusted under 35 U.S.C. 154(b) by 177 days.

(21) Appl. No.: 18/202,042

(22) Filed: May 25, 2023

Related U.S. Application Data

(63) Continuation-in-part of application No. 17/860,726, filed on Jul. 8, 2022, now abandoned.

(51) Int. Cl.

| | |
|---|---|
| *H05B 47/10* | (2020.01) |
| *F21V 23/04* | (2006.01) |
| *H05B 47/11* | (2020.01) |
| *H05B 47/13* | (2020.01) |
| *H05B 47/16* | (2020.01) |
| *H05B 47/17* | (2020.01) |

(52) U.S. Cl.
CPC ......... *H05B 47/13* (2020.01); *F21V 23/0471* (2013.01); *H05B 47/11* (2020.01); *H05B 47/16* (2020.01); *H05B 47/17* (2020.01)

(58) Field of Classification Search
CPC ...... H05B 47/10; H05B 47/13; H05B 47/155; H05B 47/16; H05B 45/10; H05B 45/20
See application file for complete search history.

(56) References Cited

U.S. PATENT DOCUMENTS

| | | | | |
|---|---|---|---|---|
| 4,125,767 A | * | 11/1978 | Silver ................. | H05B 39/081 |
| | | | | 250/214 D |
| 2012/0025717 A1 | * | 2/2012 | Klusmann ............ | H05B 47/197 |
| | | | | 315/152 |
| 2017/0013695 A1 | * | 1/2017 | Kelley ................. | H05B 47/115 |
| 2018/0263094 A1 | * | 9/2018 | Chang ................. | H05B 47/185 |

FOREIGN PATENT DOCUMENTS

CN 210219439 U * 3/2020

* cited by examiner

*Primary Examiner* — Jimmy T Vu
(74) *Attorney, Agent, or Firm* — Leech Tishman Fuscaldo & Lampl, LLC

(57) ABSTRACT

A sensor-enabled lighting system is provided with a sensor portion including a circuit board configured for performing multiple illumination functions; and multiple control switches structured for: accessibility by a user, and direct interface with the circuit board of the sensor portion for adjusting operational parameters of the illumination functions of the lighting system. In one aspect, all of the multiple control switches are collectively manually accessible by a user at a bottom portion of the sensor portion of the lighting system.

14 Claims, 13 Drawing Sheets

SPECIFICATIONS

| | |
|---|---|
| Power supply | 12V–24V DC, >30mA |
| Dim control output | 0-10V, max. 25mA sinking current |
| Dim control output | 0-10V |
| Detection radius | 1-8m |
| Mounting height | Max 40ft.(12meters) |
| Time delay | 3min/10min/30min/1hour |
| Temperature | -4°F ~ +140°F (-20°C ~ +60°C) |
| IP rating | IP65 |

FIG. 5

Settings on this demonstration:
Hold-time: 10min
Setpoint on: 50lux
Setpoint off: 500lux
Stand-by Dim: 10%
Stand-by period: +∞
(when the smart photocell sensor open, the stand-by time is only +∞)

ENHANCED TOOLS AND TECHNIQUES FOR OPERATIONAL CONTROL AND CONFIGURATION OF LIGHTING SYSTEMS AND ASSEMBLIES

CROSS-REFERENCE TO RELATED APPLICATIONS/PRIORITY CLAIM

The present continuation-in-part application claims the priority benefit of currently pending U.S. patent application Ser. No. 17/860,726, filed on Jul. 8, 2022, the entirety of which is hereby incorporated by reference into the present application.

FIELD OF THE INVENTION

In various embodiments, the present invention generally relates to the operational aspects and configuration of lighting systems and lighting assemblies.

BACKGROUND

Providing effective lighting and illumination is an essential aspect of many aspects of society, whether in residential, commercial, industrial, indoor, outdoor settings, or in many other environments, and/or for many different purposes. Typically, the controls provided with more complex lighting systems and lighting assemblies are not user friendly. A lighting system with sensor capabilities, for example, often requires significant disassembly, physical reconfiguration, or complicated process steps to make changes in how and when illumination is generated by the lighting system. Complicated wireless remote control systems often do not function as intended, and can be difficult to repair when not functioning properly or not functioning at all.

What are needed therefore are enhanced tools and techniques for enabling more effective and efficient user access to and control of lighting system configuration modifications, including operational parameters which control the illumination generated by the lighting system.

BRIEF DESCRIPTION OF THE FIGURES

FIG. 5 provides a tabulation of various operational specifications for the lighting system of FIG. 1.

DESCRIPTION

Figure 1:
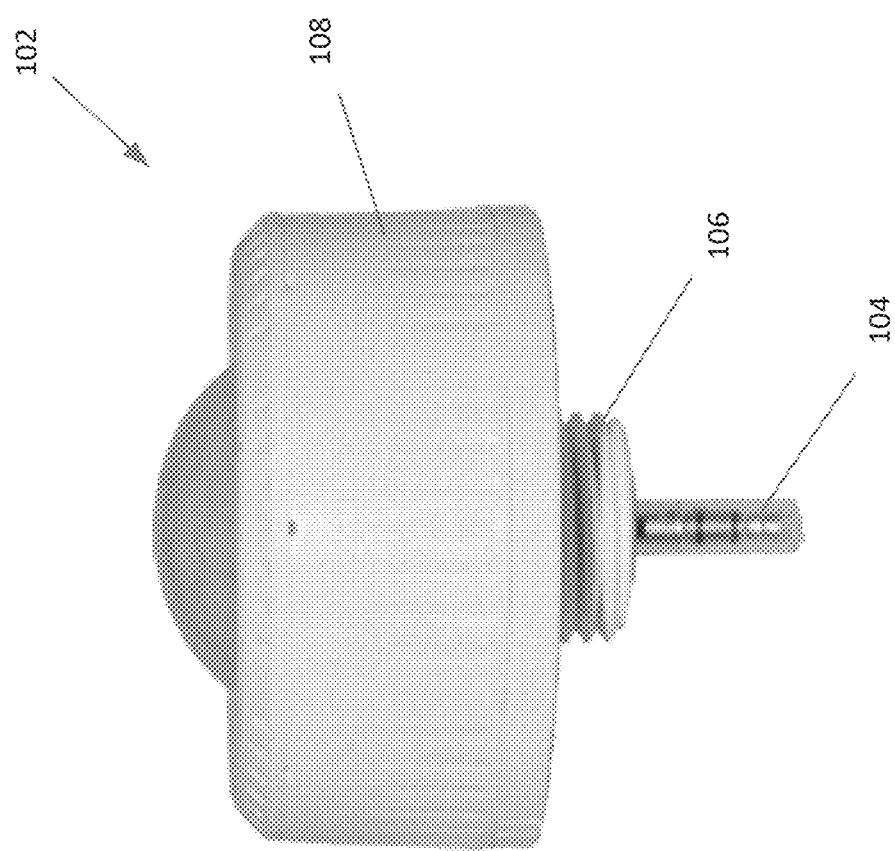
FIG. 1 includes a three-dimensional elevational view of one example of a lighting system configured in accordance with certain embodiments of the present invention.
Figure 2:
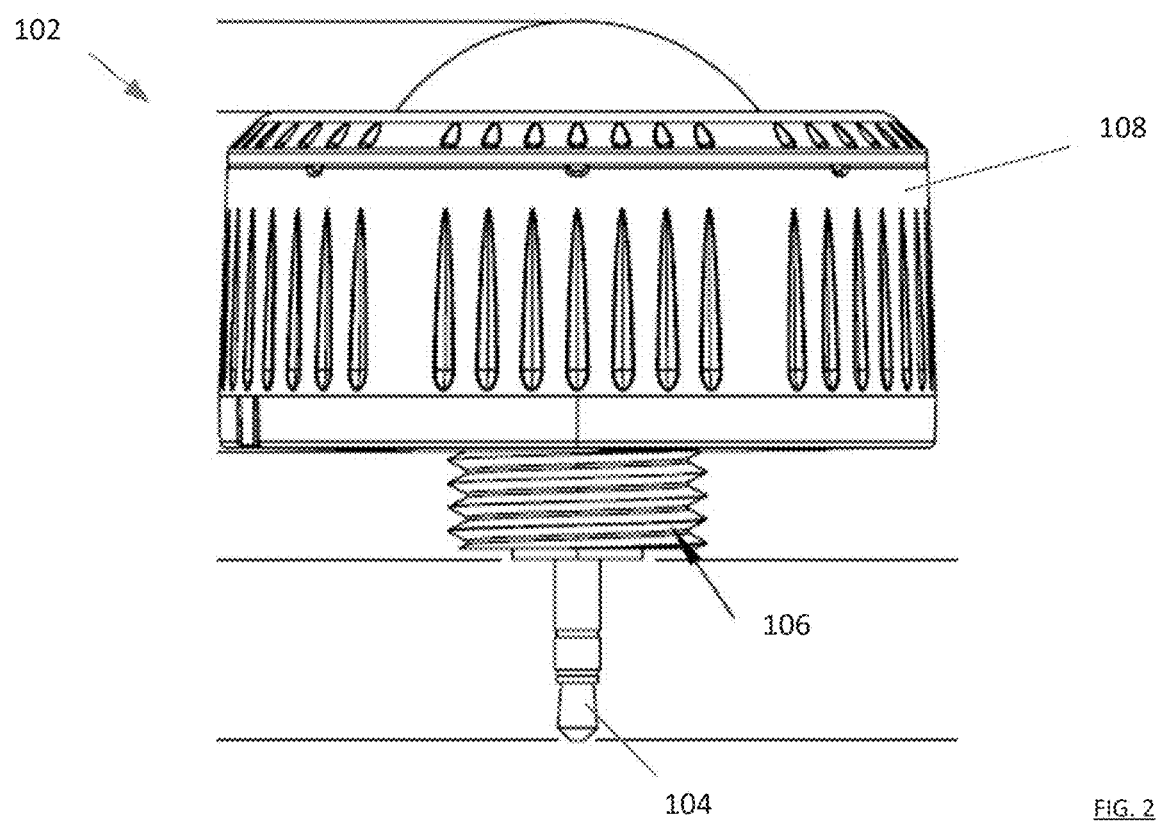
FIG. 2 includes a side elevational plan view of the lighting system of FIG. 1.
Figure 3:
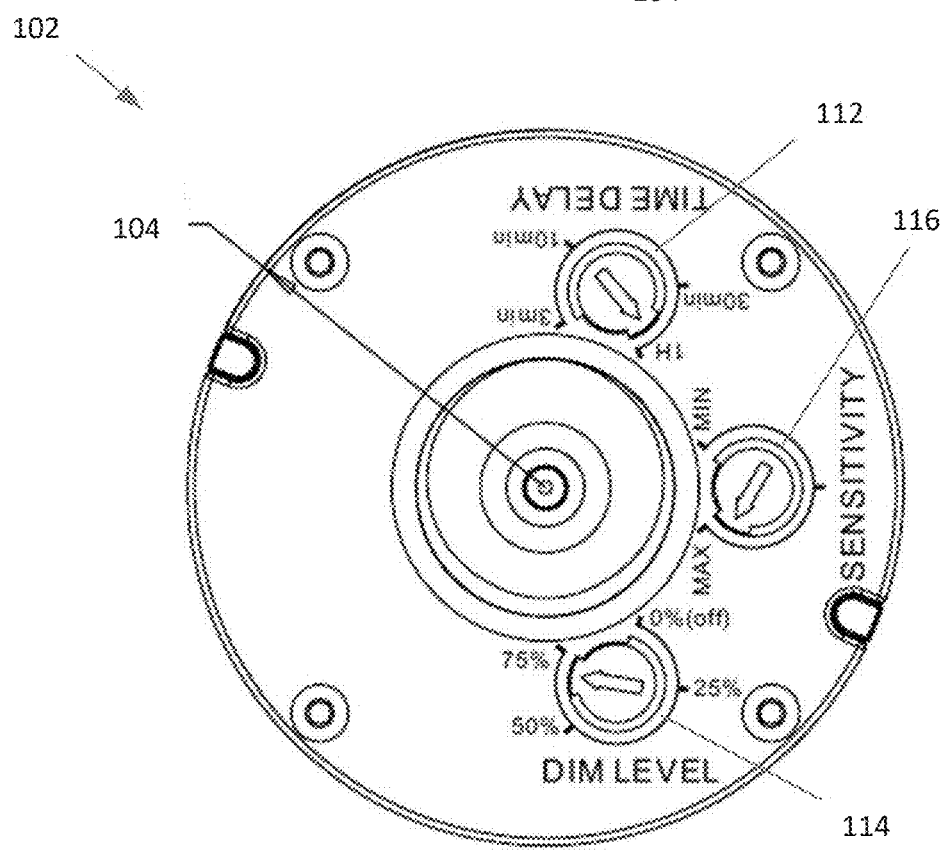
FIG. 3 includes a bottom elevational plan view of the lighting system of FIG. 1.

In developing the various embodiments of the invention, the inventor has realized the benefits of providing a sensor-enabled lighting system or lighting assembly with illumination controls located in an accessible portion of the lighting system.

As described in more detail wherein, the illumination control settings for a lighting system 102 can be configured in accordance with certain embodiments of the invention to provide ready user access to control and configure operational parameters of the lighting system 102. In one embodiment, FIGS. 1 through 4 illustrate an example of a bi-level passive infrared sensor (PIR) sensor-enabled lighting system which can be used for high bay light applications, for example. However, other types of sensors can be employed within the scope of present invention. For example, the sensor could also be a bi-level high frequency (HF) microwave sensor, or another type of sensor.

In this example, a screw-type sensor-enabled lighting system 102 is shown with a center pin plug 104 and a threaded portion 106 extending from a sensor portion 108 which houses a circuit board 110. The circuit board 110 is configured with and/or programmed with hardware, firmware, software, and/or other circuitry for performing various functions within the system 102. In one aspect, a dial-based or knob-based control switch 112 is positioned to interface with the circuit board 110 in the sensor portion 108. The control switch 112 can be accessed by a user, for example, to set a time delay parameter for illumination provided by the system 102. The time delay can represent the time that elapses between: (1) when the most recent motion has been detected by the sensor portion 108 causing activation of illumination of the system 102 at a first activation level, and (2) when sufficient time has passed without detecting further motion to cause the system 102 to illuminate at a second activation level. In the example shown, the time delay parameter value can be selected to be 3 minutes, 10 minutes, 30 minutes, or one hour, as determined by a user. In various embodiments, the center pin plug 104 supplies electrical power to the circuit board 110, among other components of the lighting system 102.

In another aspect, a control switch 114 is positioned to interface with the circuit board 110 in the sensor portion 108. The control switch 114 can be accessed by a user, for example, to set a dim level parameter for illumination provided by the system 102. The dim level parameter can represent the degree of illumination which the system 102 should provide (e.g., 0% (off), 25% (on), 50% (on), or 75% (on) when the sensor portion 108 no longer detects movement or presence of objects or people within the range of detection of the system 102 after any applicable time delay period has elapsed. If no motion is detected, illuminated can be turned down to 0 to 75% brightness, depending on the preset brightness level (e.g., 0%, 25%, 50%, or 75%). Thereafter, when motion is detected, illuminate can be activated at a 100% brightness, for example.

In another aspect, a control switch 116 is positioned to interface with the circuit board 110 in the sensor portion 108. The control switch 116 can be accessed by a user, for example, to set a sensitivity parameter for illumination provided by the system 102. The sensitivity parameter allows for adjustment of the detection range of the system 102. For example, turning the switch 116 clockwise (up to a "MAX" setting) can increase the sensitivity representing the range in which movement is detected and acted on by the sensor portion 108, or turning the switch 116 counter-clockwise (down to a "MIN" setting) can decrease the sensitivity or range in which movement is detected and acted on by the sensor portion 108

In other devices, setting adjustments are normally achieved using a remote control. However, it can be seen how the present approach for the sensor portion 108 allows the user to adjust settings directly on the sensor portion 108 itself without the need for a remote control device. The control switches 112, 114, 116 are collectively concentrated and accessible at their positioning in the vicinity of the bottom part of the sensor portion 108. Also, significant disassembly of the system 102 is not necessary to reconfigure the illumination sensor settings which are adjustable via the control switches 112, 114, 116.

Figure 4:
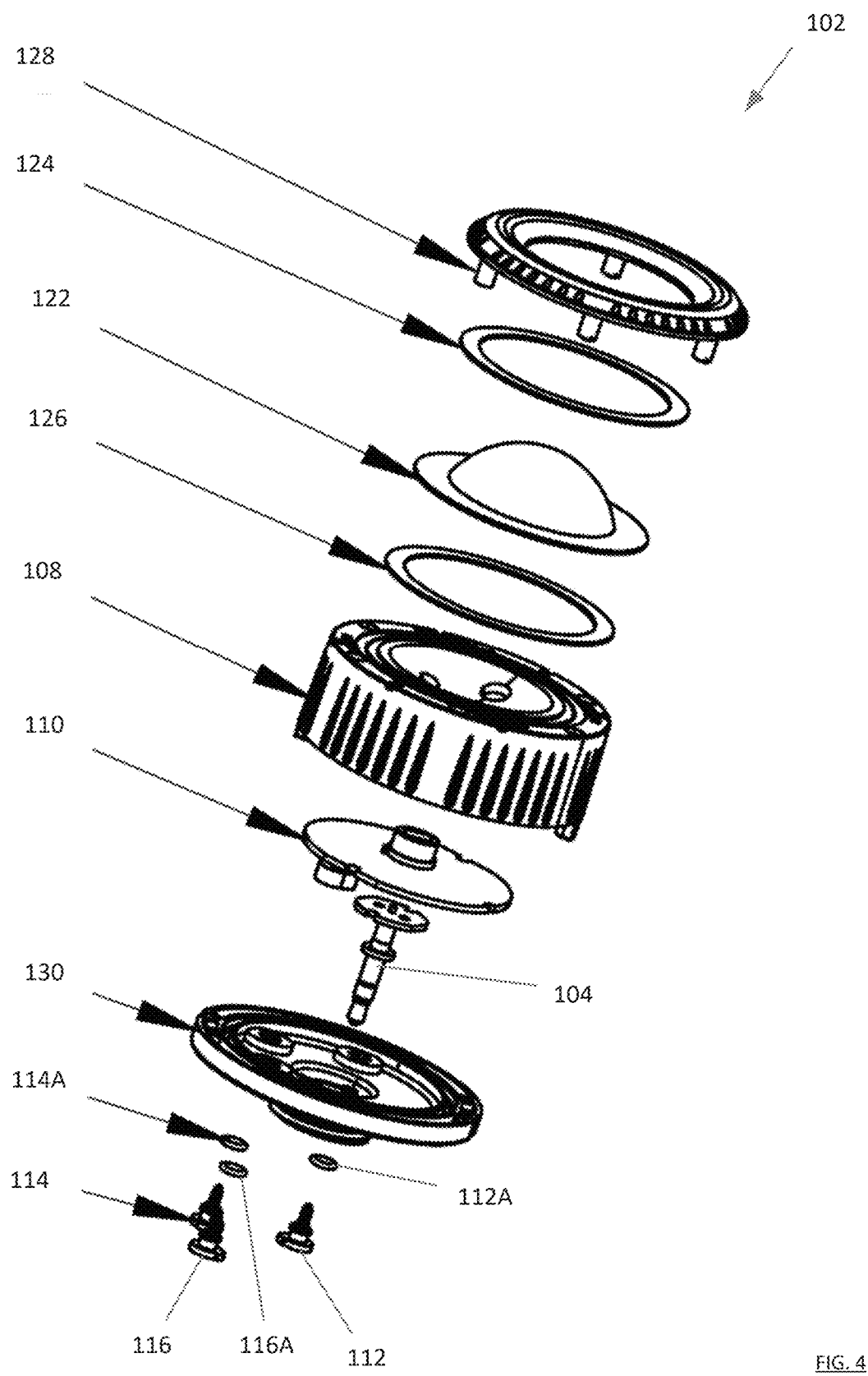
FIG. 4 includes an exploded three-dimensional view of the lighting system of FIG. 1.

With reference to FIG. 4, in one embodiment the lighting system 102 can be mounted in an outdoor lighting fixture, for example, and can provide multi-level control features based on detected motion. Among other features, the system 102 can include 0-10 VDC LED drivers and/or dimming ballasts, and may be rated for use in wet and cold locations. In the example shown, the system include a lens 122 encased by two washers 124, 126. An upper cover 128 engages with a top portion of the sensor portion 108 to retain the lens-washer combination 122, 124, 126 therein. The lens 122 may be a Fresnel lens, for example, comprised of high density polyethylene (HDPE) plastic. The washers 124, 126 may comprise a rubber material, for example, such as silicone. In another aspect, a bottom cover 130 is structured to engage with the sensor portion 108 to retain the circuit board 110 and pin 104 therein. The covers 128, 130 may be comprised of a material such as polycarbonate (PC) plastic. Also, O-rings 112A, 114A, 116A, may be positioned for seating the control switches 112, 114, 116 (respectively) into the bottom cover 130 to interface with the circuit board 110. The O-rings 112A, 114A, 116A may comprise a suitably flexible material such as rubber or silicone, for example.

FIG. 5 provides a tabulation of various examples of operational specifications which can be configured for the illustrative lighting system 102 embodiment shown in FIGS. 1 through 4.

Figure 6B:
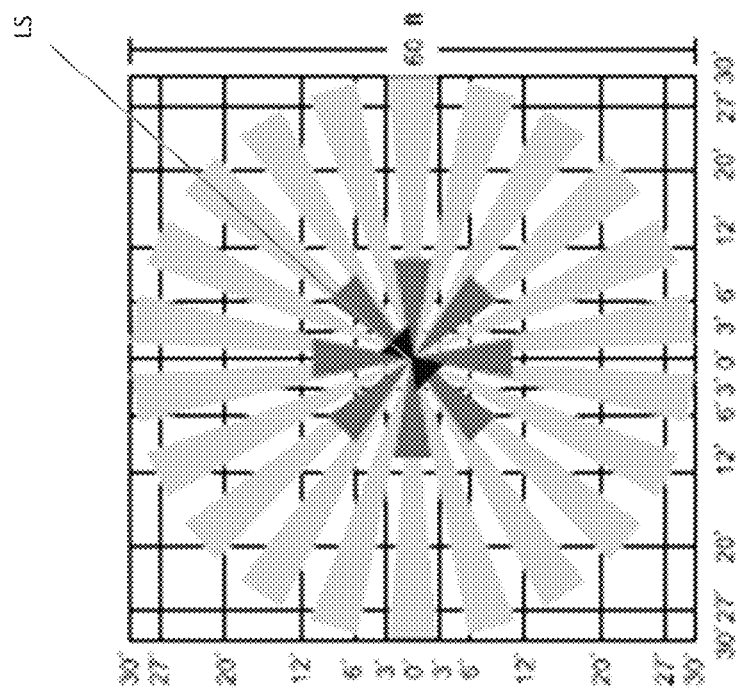
FIG. 6B includes a top view graph illustrating examples of detection coverage distance correlated to sensitivity parameters for the lighting system of FIG. 1.
Figure 6A:
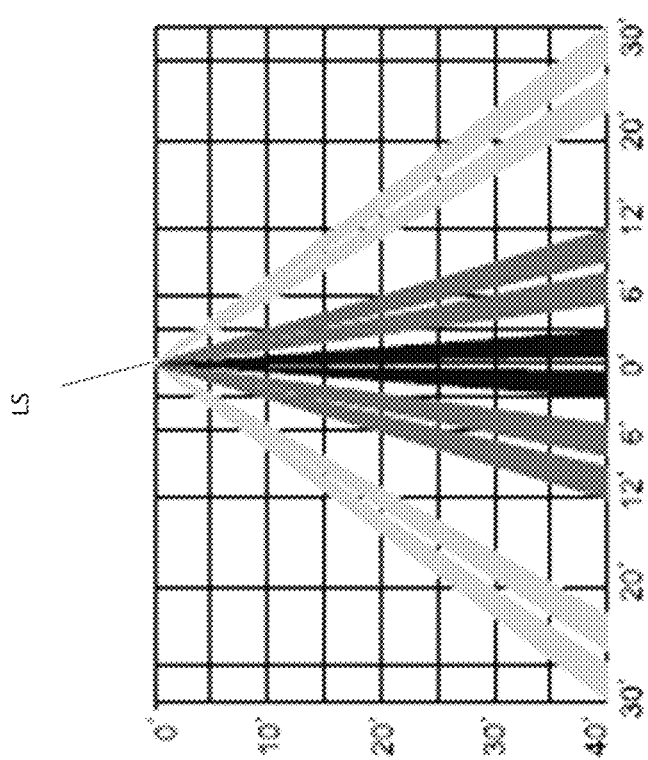
FIG. 6A includes a side view graph illustrating examples of detection coverage distance correlated to sensitivity parameters which can be configured for the lighting system of FIG. 1.

FIG. 6A includes a side view graph illustrating examples of detection coverage distance (in feet) correlated to sensitivity parameters which can be configured for the lighting system 102 (as positioned at location LS), such as by using the control switch 116. FIG. 6B includes a top view graph illustrating examples of detection coverage distance (in feet) correlated to sensitivity parameters which can be configured for the lighting system 102 (as positioned at location LS), such as by using the control switch 116.

Figure 7A:
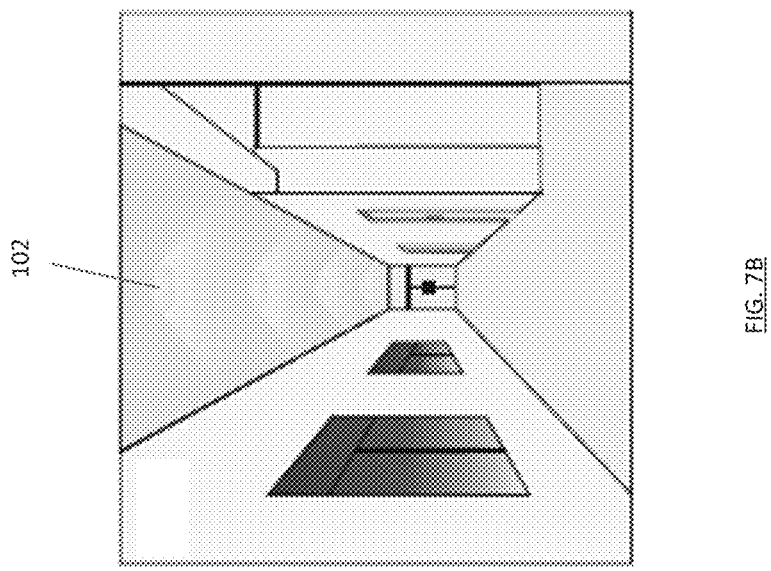
FIG. 7A schematically illustrates an example of the lighting system of FIG. 1 at full illumination when movement is detected within a detection range of the lighting system.
Figure 7B:
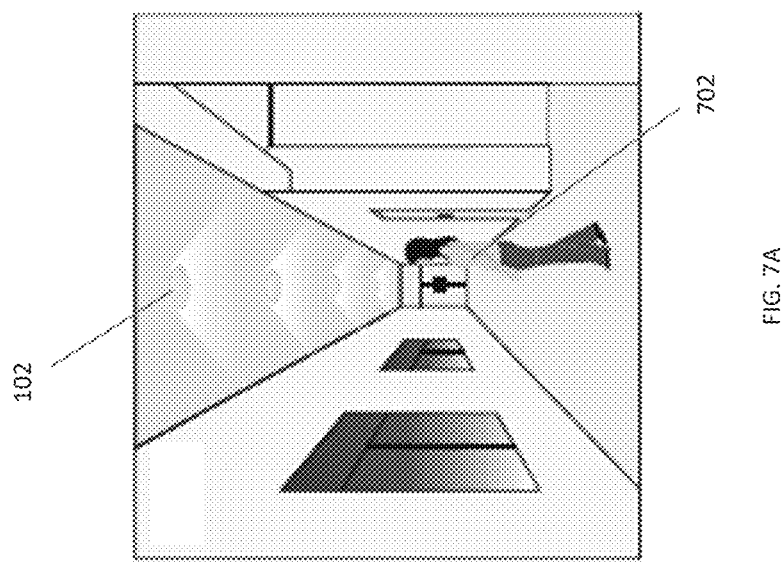
FIG. 7B schematically illustrates an example of the lighting system of FIG. 1 at a predetermined dim level.

FIG. 7A schematically illustrates an example of the lighting system 102 at full (100%) illumination when movement is detected, such as by a person 702 moving through a building area within the detection range of the system 102. FIG. 7B schematically illustrates an example of the lighting system 102 at a predetermined dim level (e.g., 75%, 50%, 25%, or 0% (off)) of illumination. The dim level may be engaged when movement is no longer detected, such as after the person 702 has left the area within the detection range of the system 102, and after a predetermined delay time has elapsed with no further movement detected by the system 102 during the time delay period.

Figure 8:
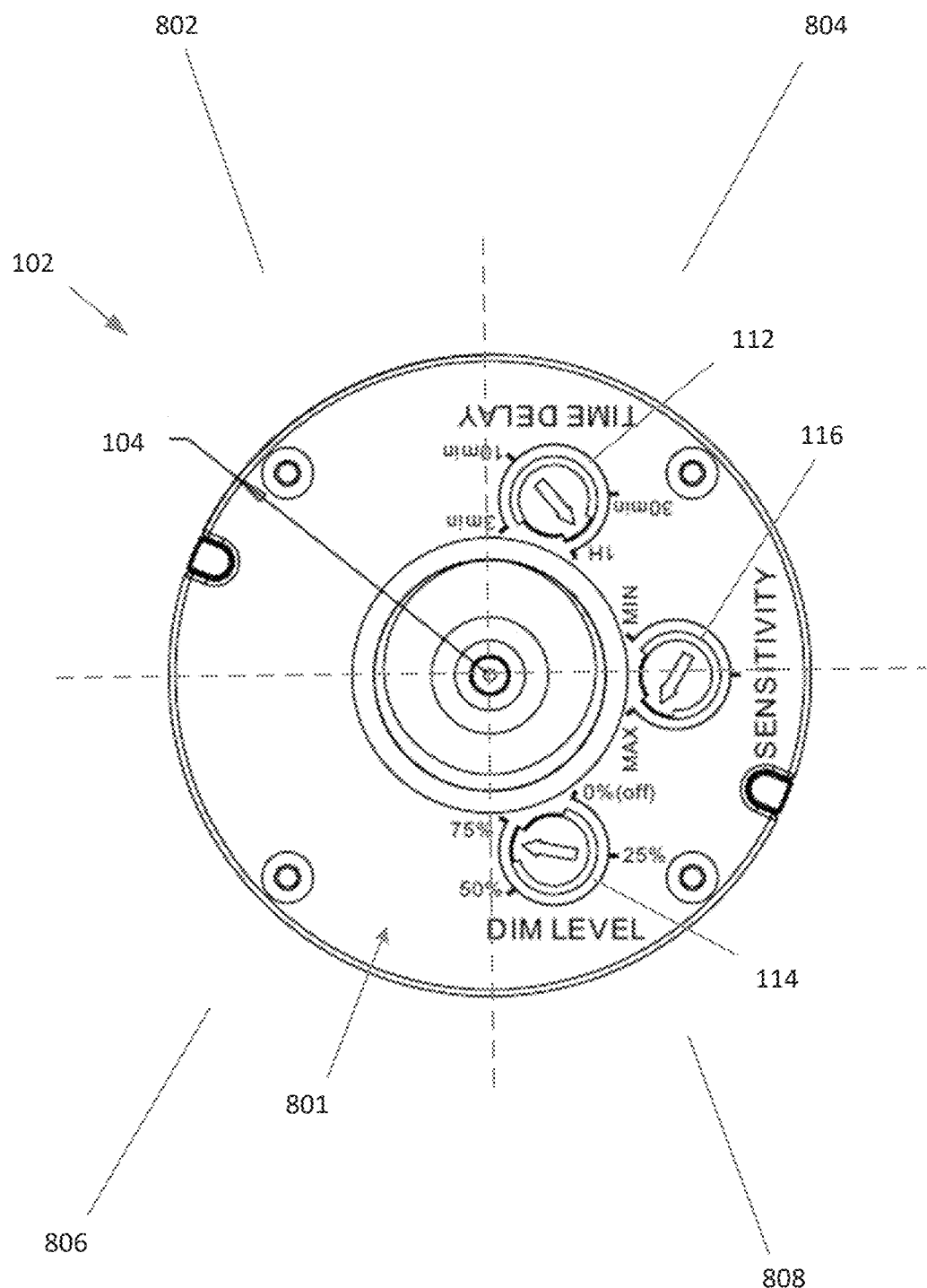
FIG. 8 schematically illustrates dividing a bottom portion of the sensor portion of the lighting system of FIG. 1 into multiple quadrants in which the control switches can be positioned for ready and convenient access and use.

FIG. 8 schematically illustrates dividing a bottom portion 801 of the lighting system 102 into multiple quadrants 802, 804, 806, 808 in which the control switches 112, 114, 116 can be positioned for access and use. In the example shown, the control switches 112, 114, 116 are concentrated and confined to just two quadrants 804, 808. As noted above, placement of the control switches 112, 114, 116 in this manner facilitates enhanced manual access and manipulation, for example, by a user seeking to adjust the operational parameters of the lighting system 102. In another embodiment, all of the control switches 112, 114, 116 can be confined and concentrated into one of the quadrants 802, 804, 806, 808, for example, within the bottom portion 801 of the system 102.

Figure 9:
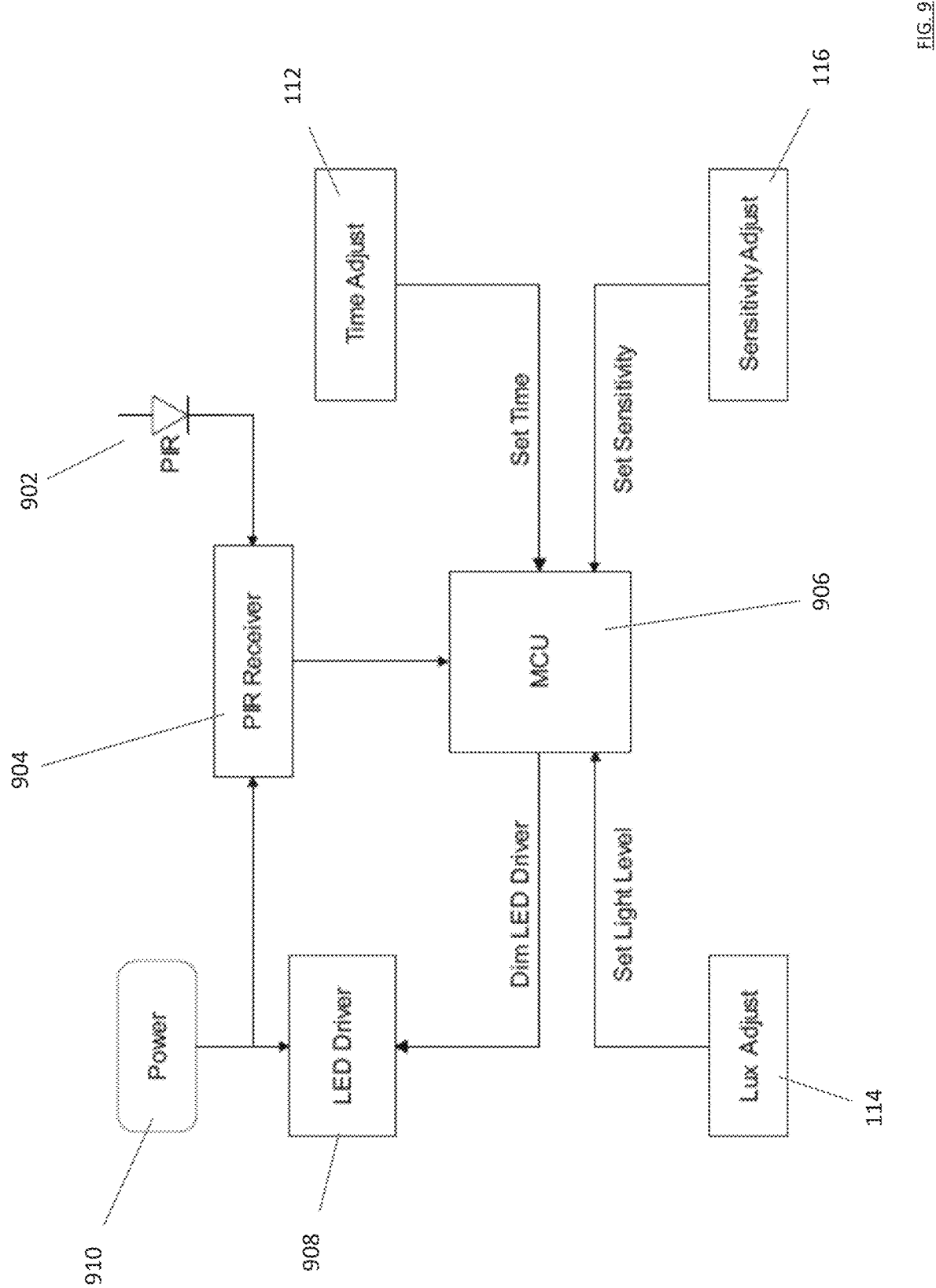
FIG. 9 includes a block diagram illustrating different functions and a process flow for various components of the lighting system of FIG. 1.

FIG. 9 includes a block diagram illustrating different functions and certain aspects of a process flow for various components of one embodiment of the lighting system 102. In this example, when passive infrared sensor (PID) 902 detects movement within the vicinity of the lighting system 102, a signal representative of the detected movement can be communicated to a PID receiver 904. The PID receiver 904 is operatively associated with a controller 906 (e.g., master control unit or "MCU") which determines how, when, and/or to what degree to activate light emitting diode (LED) driver 908 to generate light from the system 102. The controller 906 can direct illumination of the system 102 in accordance with one or more settings of the control switches 112, 114, 116. Also, a power source 910 can be operatively associated with the system 102 to provide electrical power to its various components.

Figures 10A, 10B:
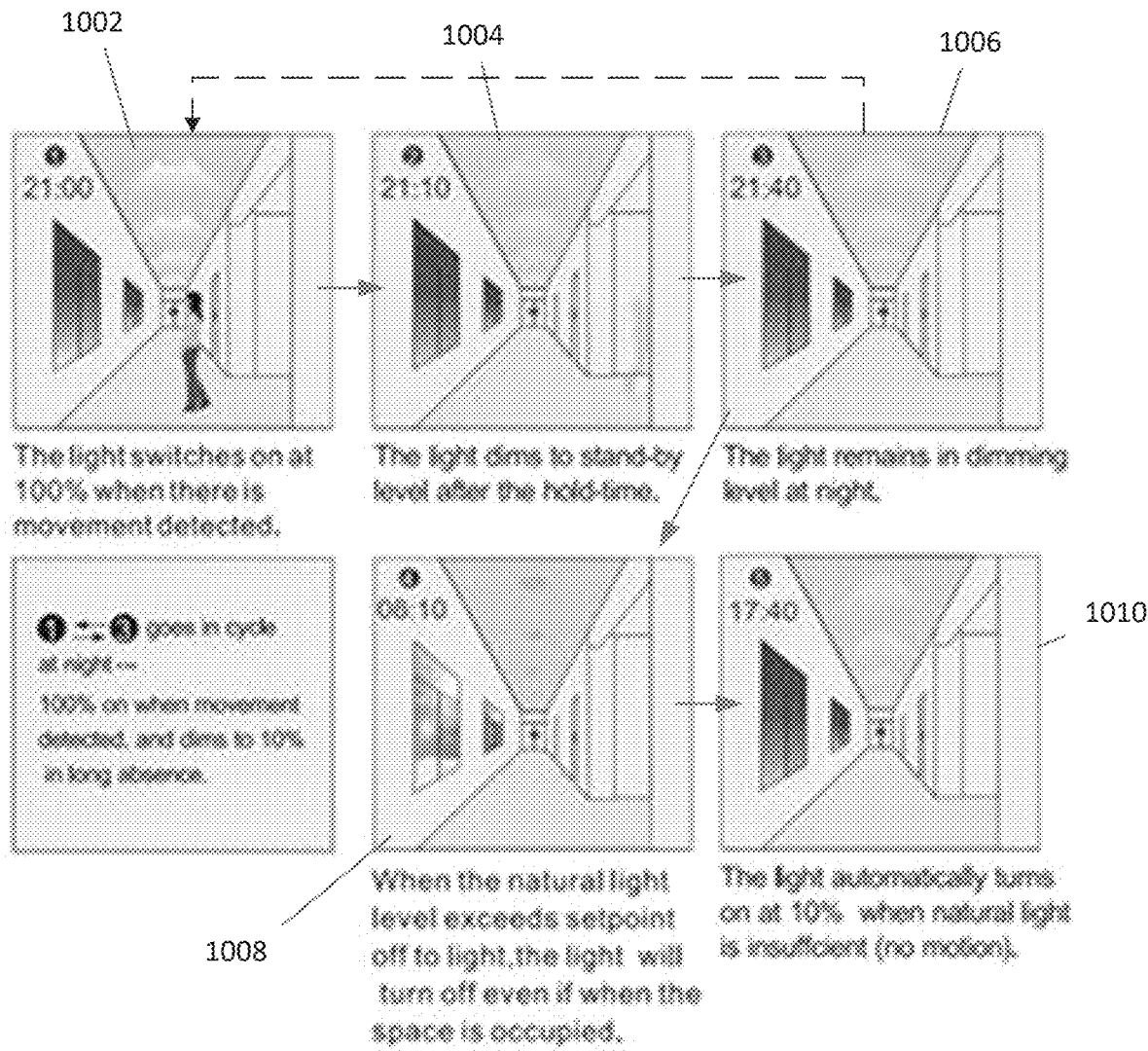
FIG. 10A includes a block diagram illustrating examples of different functions and a process flow for various components of a lighting system.
FIG. 10B includes a table listing examples of parameters applicable to the example illustrated in FIG. 10A.

FIG. 10A includes a block diagram illustrating examples of different functions and a process flow for various components of a lighting system. FIG. 10B includes a table listing examples of parameters applicable to the example illustrated in FIG. 10A. At step 1002, the lighting system 102 can be configured with a smart photocell sensor portion 1102 configured to fully activate the system 102 (e.g., at or near 100% illumination) when motion is detected by a motion detector of the system 102. At step 1004, the lighting system 102 can be configured to dim the illumination level by a predetermined stand-by dim value (e.g., 10%) after a predetermined hold time (e.g., 10 minutes) has passed without the system 102 detecting movement in the designated detection area or location. At step 1006, if the system determines that ambient lighting in the vicinity or environment of the sensors of system 102 is in a range of illumination consistent with night or evening (e.g., at a setpoint in the range 50 lux to 300 lux or less), then the system 102 can maintain illumination levels at dim level for the duration of the ambient or environmental night illumination condition. As shown, steps 1002 through 1006 may cycle and repeat as necessary during the ambient environment night condition, while movement continues to not be detected by the system 102.

At step 1008, when the sensor portion 1102 of the lighting system 102 detects that the ambient or environmental lighting conditions in the vicinity of the system 102 are indicative of a daytime condition (e.g., at a setpoint of 300 lux or greater), then illumination provided by the system 102 can be completely deactivated. In one aspect, illumination generated by the system 102 can be deactivated even if subsequent motion is detected in the vicinity of the system 102 (e.g., because the daytime ambient environment lighting condition detected by the sensor portion 1102 is assumed to be sufficient lighting for the detection area). At step 1010, if no motion is detected in the detection area and the daytime ambient environment lighting condition is determined to be an insufficient level of illumination, then the system 102 can be configured to engage the stand-by dim level of illumination.

Figure 11:
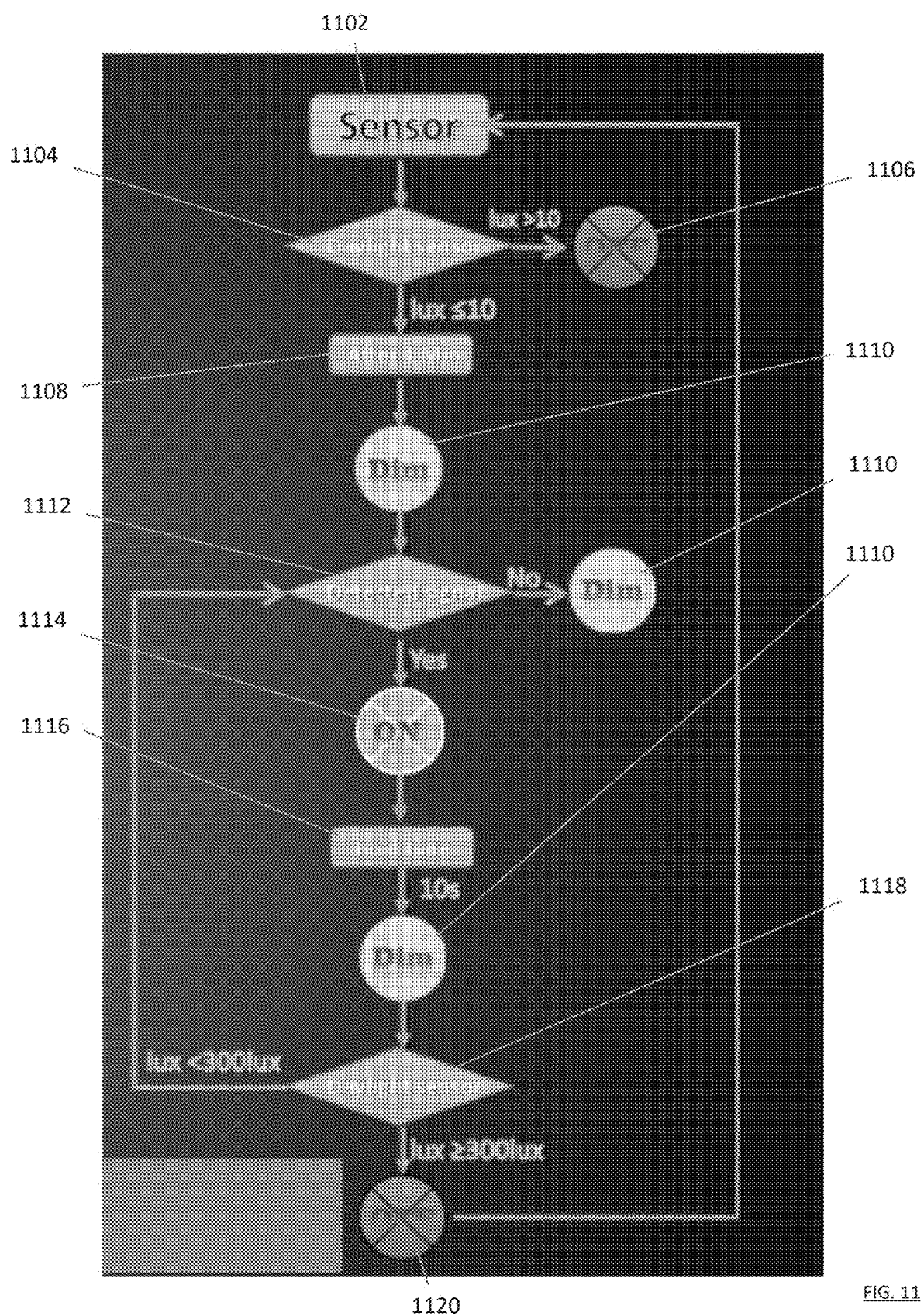
FIGS. 11 and 12 include examples of process flow diagrams illustrating the function and operational aspects of various components of a lighting system.
Figure 12:
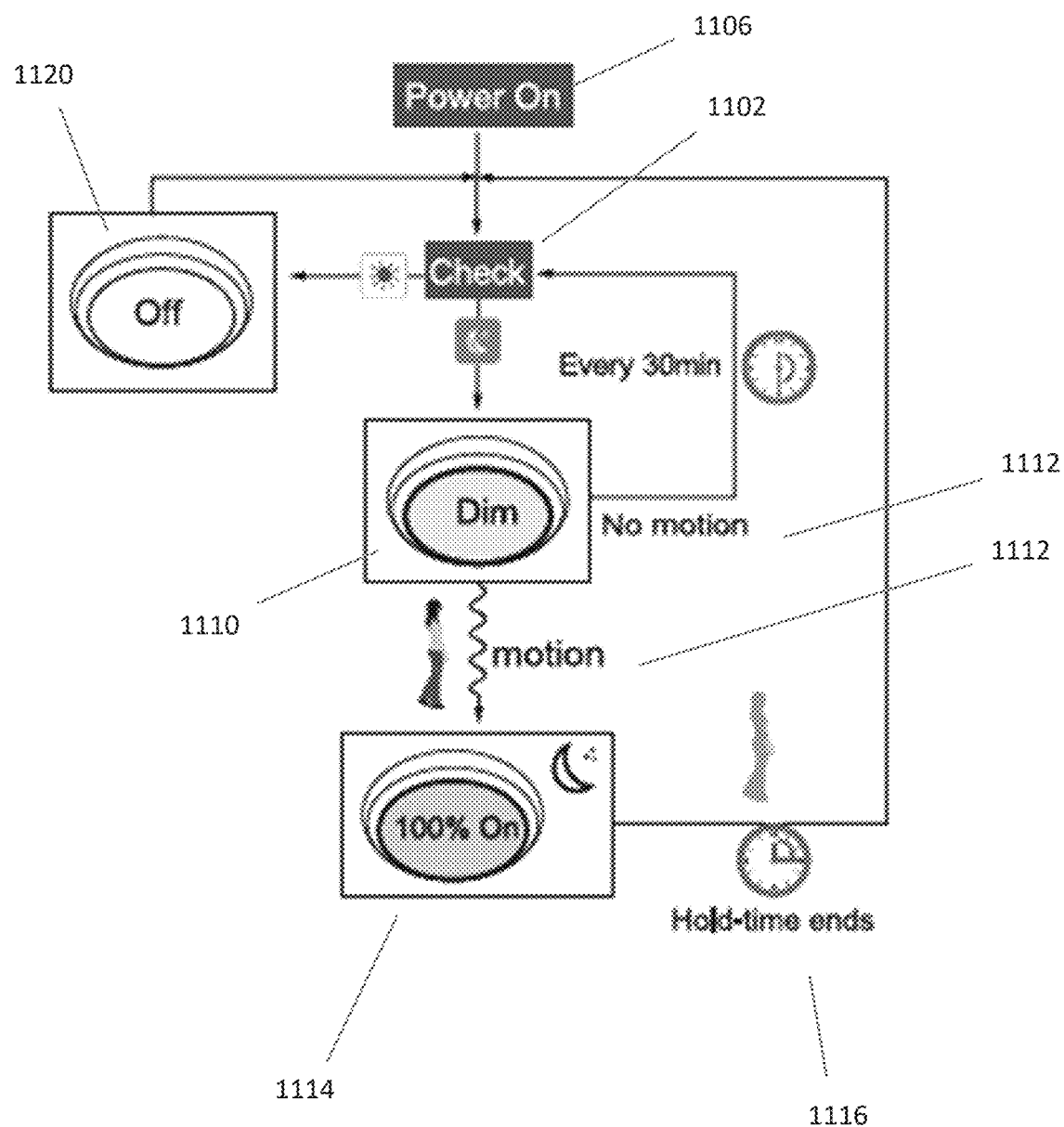

FIGS. 11 and 12 include examples of process flow diagrams illustrating the function and operational aspects of various components of a lighting system 102. In these embodiments, the lighting system 102 incudes a smart photocell sensor portion 1102 configured for detecting and controlling certain functional aspects of the system 102. At step 1104, the sensor portion 1102 determines whether ambient lighting conditions in the environment or vicinity of the system 102 are indicative of a predetermined level of illumination. If the sensed lighting condition is greater than 10 lux, for example, then this can indicate a daytime ambient environment lighting condition and illumination provided by the system 102 can be deactivated accordingly at step 1106. If the sensed lighting condition is less than or equal to 10 lux, then this can indicate a nighttime ambient environment lighting condition and illumination provided by the system 102 can be maintained for a predetermined holding period (e.g., one minute) at step 1108 and then reduced to a dim level of illumination at step 1110.

This step 1110 dim level can be maintained unless and until motion is detected by a motion sensor of the lighting system 102 at step 1112. In response to this detected motion, the system 102 can be fully illuminated at step 1114. If no further motion is detected, then illumination provided by the system 102 can be maintained for a predetermined holding period (e.g., one minute) at step 1116, and then reduced to a dim level of illumination at step 1110. At step 1118, in this example, if the sensed lighting condition is greater than or equal to 300 lux, then this can indicate a daytime ambient lighting condition and illumination provided by the system 102 can be deactivated accordingly at step 1120. Processing performed by the sensor portion 1102 then resumes as shown in FIG. 11. However, if the sensed lighting condition is determined at step 1118 to be less than 300 lux, then this can indicate a nighttime ambient environment lighting condition and/or otherwise a need from time to time for sufficient illumination within the detection area. At this point, processing by the system 102 can proceed back to step 1112 for detection of potential movement within the detection area.

Figure 13:
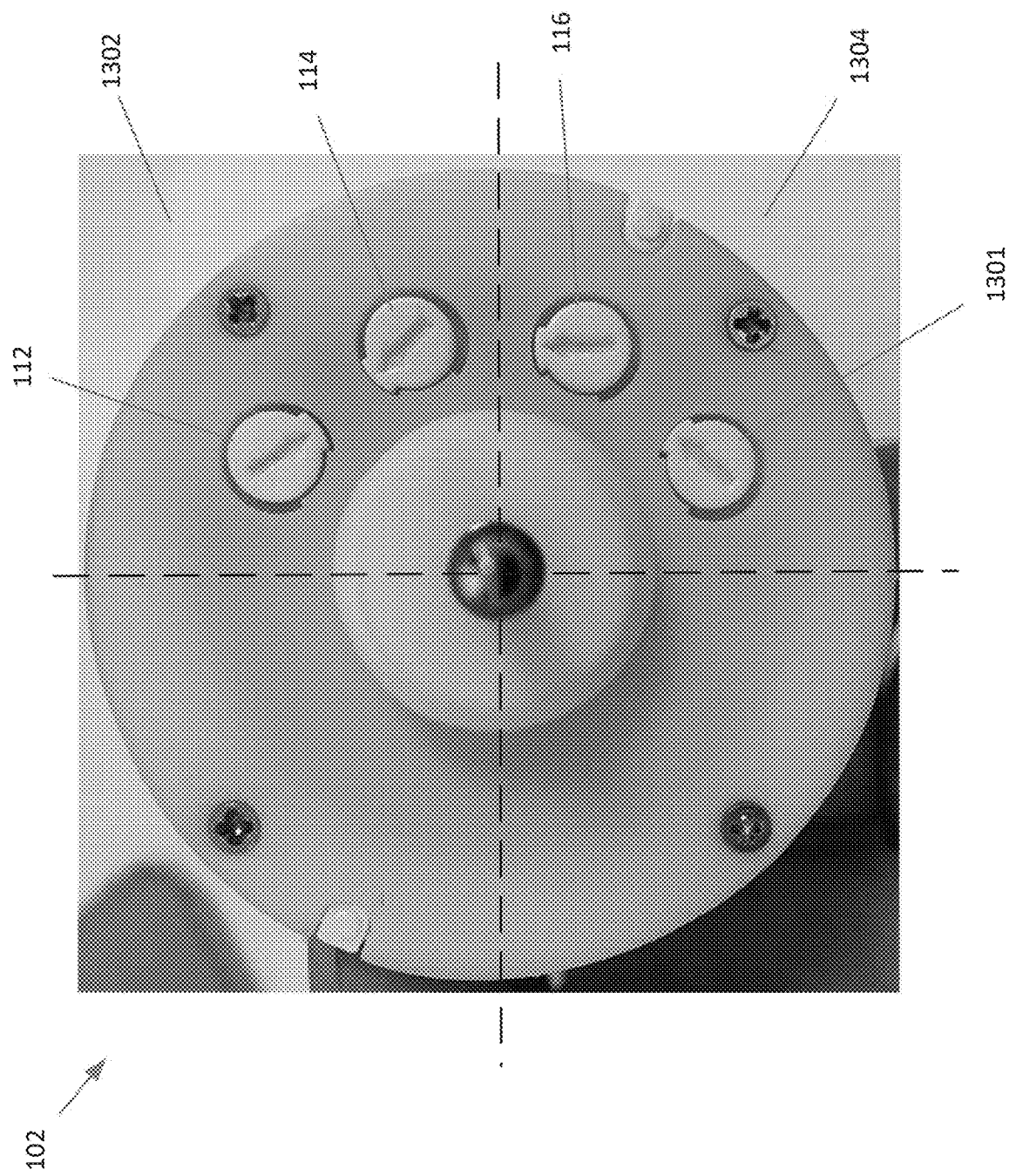
FIG. 13 schematically illustrates an example of dividing a bottom portion of a sensor portion of a lighting system into multiple quadrants in which the control switches can be positioned for readily available manual access and use.

FIG. 13 schematically illustrates dividing a bottom portion of a sensor portion of the lighting system 102 into multiple quadrants 1302, 1304 in which control switches 112, 114, 116, 1301 can be positioned for readily available manual access and use. FIG. 13 schematically illustrates dividing a bottom sensor portion of the lighting system 102 into quadrants 1302, 1304 in which the control switches 112, 114, 116, 1301 can be positioned for access and use. In the example shown, the control switches 112, 114, 116, 1301 are concentrated and confined to the two quadrants 1302, 1304. In this example, the control switch 1301 is configured to control parameters for activation and operation of ambient environment lighting condition features the smart photocell sensor 102, as described in various examples hereinabove. As noted above, placement of the control switches 112, 114, 116, 1301 in this manner facilitates enhanced manual access and manipulation, for example, by a user seeking to adjust the various operational parameters of the lighting system 102. In another embodiment, all of the control switches 112, 114, 116, 1301 can be confined and/or concentrated into just one or two of the quadrants 1302, 1304, for example, within the bottom portion 801 of the system 102.

Figure 14:
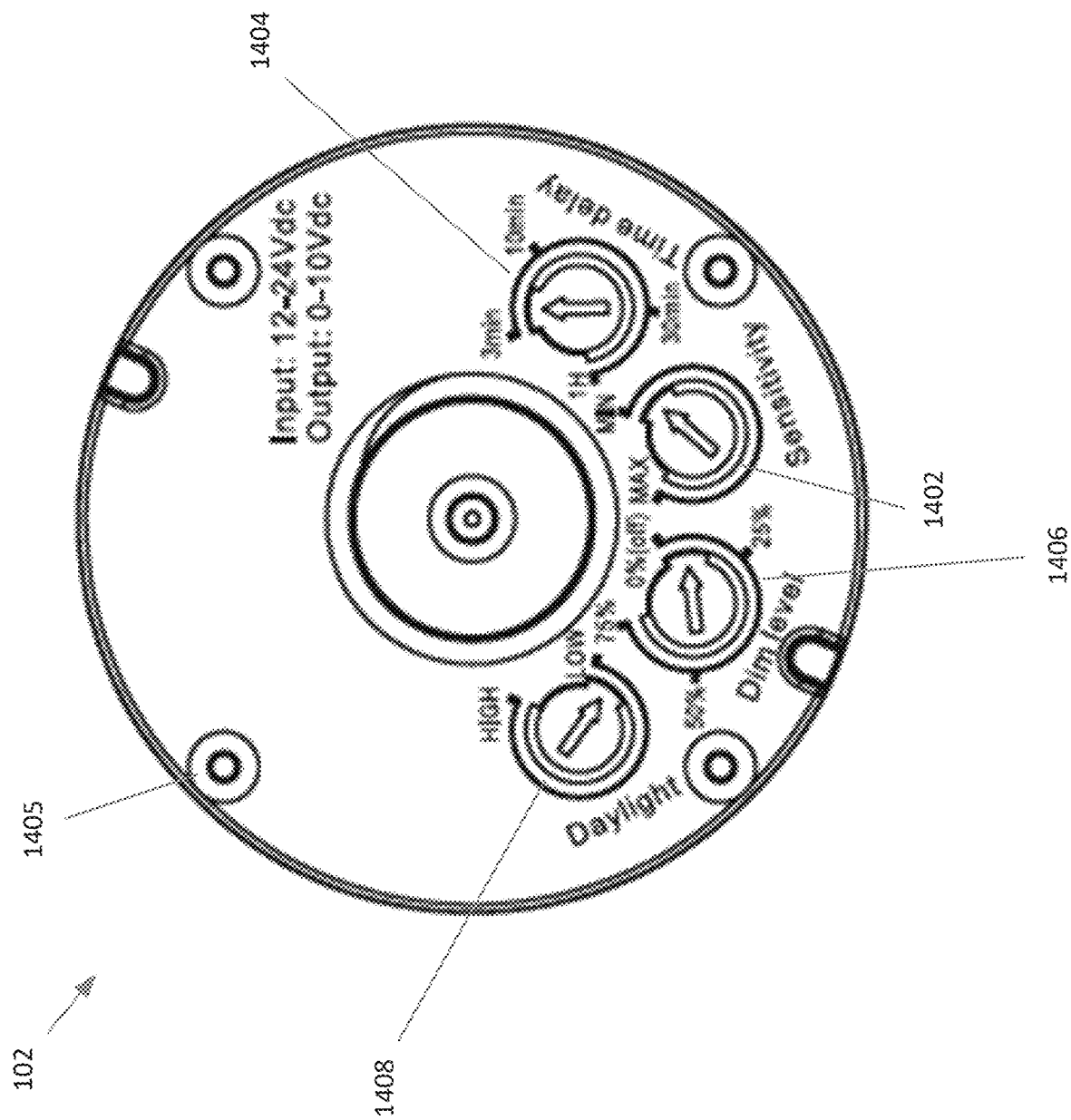
FIG. 14 schematically illustrates another example of a bottom portion of a sensor portion of a lighting system in which multiple control switches can be positioned for readily available manual access and use.

FIG. 14 schematically illustrates another example of a bottom sensor portion of a lighting system 102, in which multiple control switches 1402, 1404, 1406, 1408 can be positioned for readily available manual access and use. A sensitivity control switch 1402 can be used to adjust detection range for the system 102. For example, turning the control switch 1402 clockwise can increase the detection range and turning it anti-clockwise can decrease the detection range. In one aspect, when the sensitivity control switch 1402 is set at a "MIN" setting the detection range might be 1 m, and when the switch 1402 is set at a "MAX" setting the detection range might be 8 m. A time delay control switch 1404 can be used to set a hold time value for the system 102. Hold time can be defined as the time from when illumination level for the system 102 has been triggered (e.g., when motion has been detected by a motion sensor 1405) to a time when no further motion has been detected. The time delay control switch 1404 can be configured with a hold time duration until the system 102 triggers a standby light level. The time delay control switch 1404 may have different selectable settings, for example, of three minutes, 10 minutes, 30 minutes, or one hour. A dim level control switch 1406 can be used to select and set standby or dim level illumination levels for the system 102, such as at 0%, 25%, 50%, 75% of full light output (e.g., at 100%). For example, setting the dim level at 0% means compete illumination deactivation when no movement is detected within the detection area. An ambient environment lighting control switch 1408 can be used to determine how the lighting system 102 reacts to changes in environmental lighting conditions caused by daylight, nighttime, time of year, seasons, weather-related conditions (e.g., snow, clouds, or rain storms), and/or other conditions or external factors. The switch 1408 can have multiple settings such as "LOW" for 10 lux (input)/100 lux (output); "MIDDLE" for 30 lux (input) and 300 lux (output); and "HIGH" for 50 lux (input) and 500 lux (output). For example, for a LOW setting for the switch 1408, if the sensor of the system 102 detects input illumination of 10 lux or less, then this can be deemed a nighttime lighting condition, and the system 102 can be configured to generate output illumination of 100 lux when activated (e.g., such as when motion is detected by the motion sensor 1405 of the system 102).

The examples presented herein can be intended to illustrate potential and specific implementations of the present invention. It can be appreciated that the examples can be intended primarily for purposes of illustration of the invention for those skilled in the art. No particular aspect or aspects of the examples can be necessarily intended to limit the scope of the present invention. For example, no particular aspect or aspects of the examples of lighting system assemblies, circuit diagrams, or other illustrative schematics described herein are necessarily intended to limit the scope of the invention unless included in the claims for this application.

It is to be understood that the figures and descriptions of the present invention have been simplified to illustrate elements that can be relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention as may be defined by such means-plus-function claims, resides in the fact that the functionalities provided by the various recited means can be combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium. In certain embodiments, artificial intelligence techniques, machine learning algorithms, and/or rules-based algorithms may be employed as unconventional tools for performing the processes and executing the computer systems described herein.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual (e.g., cloud-based), permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth.

Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to execution of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that can be located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, TypeScript, Ruby, PHP, and Perl. Various embodiments may be employed in a Lotus Notes environment, for example. Such software may be stored on any type of suitable computer-readable medium or media such as, for example, a magnetic or optical storage medium.

Thus, the execution and behavior of the embodiments can be described without specific reference to the actual software code. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, cellular network communication, power line communication, or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs) remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 (Oracle) application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture. Certain embodiments of the invention may employ web servers such as Apache web servers, for example.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Various embodiments may be described herein in the general context of computer executable instructions, such as software, program modules, and/or engines being executed by a computer. Generally, software, program modules, and/or engines include any software element arranged to perform particular executions or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where executions can be performed by one or more remote processing devices that can be linked through a communications network. In a distributed computing environment, software, program modules, and/or engines may be located in both local and remote computer storage media including memory storage devices.

Although some embodiments may be illustrated and described as comprising functional components, software, engines, and/or modules performing various executions, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various executions of one or more embodiments. In various embodiments, for example, the article of manufacture may comprise a magnetic disk, optical disk, flash memory or firmware containing computer program instructions suitable for execution by an application specific processor.

Additionally, it is to be appreciated that the embodiments described herein illustrate example implementations, and that the functional elements, logical blocks, modules, and circuits elements may be implemented in various other ways which can be consistent with the described embodiments. Furthermore, the executions performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification can be not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms can be not necessarily intended as synonyms for each other. For example, some embodiments may be described using the terms "com1ected" and/or "coupled" to indicate that two or more elements can be in direct physical or electrical contact with each other. The term "coupled," however, also may mean that two or more elements can be not in direct contact with each other, but still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and can be comprised within the scope thereof. Furthermore, all examples and conditional language recited herein can be principally intended to aid the reader in understanding the principles described in the present disclosure and the concepts contributed to furthering the art, and can be to be construed as being without limitation to such specifically recited examples and conditions. Moreover, all statements herein reciting principles, aspects, and embodiments as well as specific examples thereof, can be intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software, hardware and/or dedicated hardware. If embodied in dedicated hardware, each can be implemented as a circuit or state machine that employs any one of or a combination of a number of technologies. These technologies may include, but can be not limited to, discrete logic circuits having logic gates for implementing various logic functions upon an application of one or more data signals, application specific integrated circuits having appropriate logic gates, or other components, etc.

The flow charts and methods described herein show the functionality and execution of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s). Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be omitted or not performed. It is understood that all such variations can be within the scope of the present disclosure.

The terms "a" and "an" and "the" and similar referents used in the context of the present disclosure (especially in the context of the following claims) can be to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as though it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein can be not to be construed as limitations. Each group member may be referred to and claimed individually or in any combination with other members of the group or other elements found herein. It is anticipated that one or more members of a group may be comprised in, or deleted from, a group for reasons of convenience and/or patentability.

In various embodiments of the present invention, different types of artificial intelligence tools and techniques can be incorporated and implemented in operative association with different aspects of the lighting systems and other tools and techniques described herein. Search and optimization tools including search algorithms, mathematical optimization, and evolutionary computation methods can be used for intelligently searching through many possible solutions. For example, logical operations can involve searching for a path that leads from premises to conclusions, where each step is the application of an inference rule. Planning algorithms can search through trees of goals and subgoals, attempting to find a path to a target goal, in a process called means-ends analysis.

Heuristics can be used to prioritize choices in favor of those more likely to reach a goal and to do so in a shorter number of steps. In some search methodologies heuristics can also serve to eliminate some choices unlikely to lead to a goal. Heuristics can supply a computer system with a best estimate for the path on which the solution lies. Heuristics can limit the search for solutions into a smaller sample size, thereby increasing overall computer system processing efficiency.

Propositional logic can be used which involves truth functions such as "or" and "not" search terms, and first-order logic can add quantifiers and predicates, and can express facts about objects, their properties, and their relationships with each other. Fuzzy logic assigns a degree of truth (e.g., between 0 and 1) to vague statements which may be too linguistically imprecise to be completely true or false. Default logics, non-monotonic logics and circumscription are forms of logic designed to help with default reasoning and the qualification problem. Several extensions of logic can be used to address specific domains of knowledge, such as description logics, situation calculus, event calculus and fluent calculus (for representing events and time), causal calculus, belief calculus (belief revision); and modal logics. Logic for modeling contradictory or inconsistent statements arising in multi-agent systems can also be used, such as paraconsistent logics.

Probabilistic methods can be applied for uncertain reasoning, such as Bayesian networks, hidden Markov models, Kalman filters, particle filters, decision theory, and utility theory. These tools and techniques help the system execute algorithms with incomplete or uncertain information. Bayesian networks are tools that can be used for various problems: reasoning (using the Bayesian inference algorithm), learning (using the expectation-maximization algorithm), planning (using decision networks), and perception (using dynamic Bayesian networks). Probabilistic algorithms can be used for filtering, prediction, smoothing and finding explanations for streams of data, helping perception systems to analyze processes that occur over time (e.g., hidden Markov models or Kalman filters). Artificial intelligence can use the concept of utility as a measure of how valuable something is to an intelligent agent. Mathematical tools can analyze how an agent can make choices and plan, using decision theory, decision analysis, and information value theory. These tools include models such as Markov decision processes, dynamic decision networks, game theory and mechanism design.

The artificial intelligence techniques applied to embodiments of the invention may leverage classifiers and controllers. Classifiers are functions that use pattern matching to determine a closest match. They can be tuned according to examples known as observations or patterns. In supervised learning, each pattern belongs to a certain predefined class which represents a decision to be made. All of the observations combined with their class labels are known as a data set. When a new observation is received, that observation is classified based on previous experience. A classifier can be trained in various ways; there are many statistical and machine learning approaches. The decision tree is one kind of symbolic machine learning algorithm. The naive Bayes classifier is one kind of classifier useful for its scalability, in particular. Neural networks can also be used for classification. Classifier performance depends in part on the characteristics of the data to be classified, such as the data set size, distribution of samples across classes, dimensionality, and the level of noise. Model-based classifiers perform optimally when the assumed model is an optimized fit for the actual data. Otherwise, if no matching model is available, and if accuracy (rather than speed or scalability) is a primary concern, then discriminative classifiers (e.g., SVM) can be used to enhance accuracy.

A neural network is an interconnected group of nodes which can be used in connection with various embodiments of the invention, such as execution of various methods, processes, or algorithms disclosed herein. Each neuron of the neural network can accept inputs from other neurons, each of which when activated casts a weighted vote for or against whether the first neuron should activate. Learning achieved by the network involves using an algorithm to adjust these weights based on the training data. For example, one algorithm increases the weight between two connected neurons when the activation of one triggers the successful activation of another. Neurons have a continuous spectrum of activation, and neurons can process inputs in a non-linear way rather than weighing straightforward votes. Neural networks can model complex relationships between inputs and outputs or find patterns in data. They can learn continuous functions and even digital logical operations. Neural networks can be viewed as a type of mathematical optimization which performs a gradient descent on a multi-dimensional topology that was created by training the network. Another type of algorithm is a backpropagation algorithm. Other examples of learning techniques for neural networks include Hebbian learning, group method of data handling (GMDH), or competitive learning. The main categories of networks are acyclic or feedforward neural networks (where the signal passes in only one direction), and recurrent neural networks (which allow feedback and short-term memories of previous input events). Examples of feedforward networks include perceptrons, multi-layer perceptrons, and radial basis networks.

Deep learning techniques applied to various embodiments of the invention can use several layers of neurons between the network's inputs and outputs. The multiple layers can progressively extract higher-level features from the raw input. For example, in image processing, lower layers may identify edges, while higher layers may identify the concepts relevant to a human such as digits or letters or faces. Deep learning may involve convolutional neural networks for many or all of its layers. In a convolutional layer, each neuron receives input from only a restricted area of the previous layer called the neuron's receptive field. This can substantially reduce the number of weighted connections between neurons. In a recurrent neural network, the signal will propagate through a layer more than once. A recurrent neural network (RNN) is another example of a deep learning technique which can be trained by gradient descent, for example.

While various embodiments of the invention have been described herein, it should be apparent, however, that various modifications, alterations, and adaptations to those embodiments may occur to persons skilled in the art with the attainment of some or all of the advantages of the present invention. The disclosed embodiments can be therefore intended to include all such modifications, alterations, and adaptations without departing from the scope and spirit of the present invention as described and claimed herein.

What is claimed is:

1. A sensor-enabled lighting system comprising:
   a sensor portion including a circuit board configured with at least one of hardware, firmware, software, or circuitry, and/or a combination thereof, for performing multiple illumination functions;
   multiple control switches structured for:
   accessibility by a user, and
   direct interface with the circuit board of the sensor portion for adjusting at least one operational parameter of at least one of the illumination functions; and
   wherein the multiple control switches comprise at least one time delay parameter control switch, at least one dim level parameter control switch, at least one sensitivity parameter control switch, and at least one ambient environment lighting control switch.

2. The system of claim 1, wherein the system further comprises a bi-level passive infrared sensor (PIR) sensor-enabled lighting system.

3. The system of claim 1, wherein at least one control switch comprises a knob-based or dial-based control switch.

4. The system of claim 1, wherein at least one control switch is configured to set a time delay parameter for illumination provided by the system.

5. The system of claim 4, wherein the time delay parameter represents time that elapses between:
   when the most recent motion has been detected by the sensor portion causing activation of illumination of the system at a first activation level, and
   when sufficient time has passed without the system detecting further motion to cause the system to illuminate at a second activation level.

6. The system of claim 1, wherein at least one control switch is configured to set a dim level parameter for illumination provided by the system.

7. The system of claim 6, wherein the dim level parameter represents a degree of illumination which the system provides when the sensor portion no longer detects movement within a range of detection of the system and after a predetermined time delay period has elapsed.

8. The system of claim 1, wherein at least one control switch is configured to set a sensitivity parameter for illumination provided by the system.

9. The system of claim 8, wherein the sensitivity parameter determines a detection range of the system in which movement is detected by the sensor portion.

10. The system of claim 1, wherein the multiple control switches are collectively manually accessible by a user at a bottom portion of the sensor portion.

11. The system of claim 1, wherein at least one control switch is structured for controlling at least one parameter of a photocell sensor.

12. The system of claim 1, wherein the multiple control switches are confined to two quadrants at a bottom portion of the sensor portion.

13. The system of claim 1, wherein the multiple control switches are confined to a single quadrant at a bottom portion of the sensor portion.

14. The system of claim 1, wherein the system further comprises a bi-level high frequency (HF) microwave sensor.

* * * * *